June 25, 1935.  F. A. NICHOLSON ET AL  2,005,799
APPARATUS FOR REMOVING BARK FROM LOGS
Filed Aug. 7, 1933   6 Sheets-Sheet 4
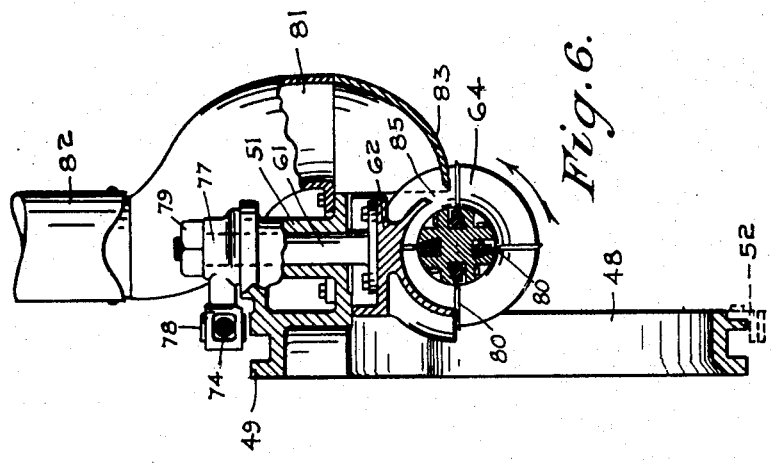
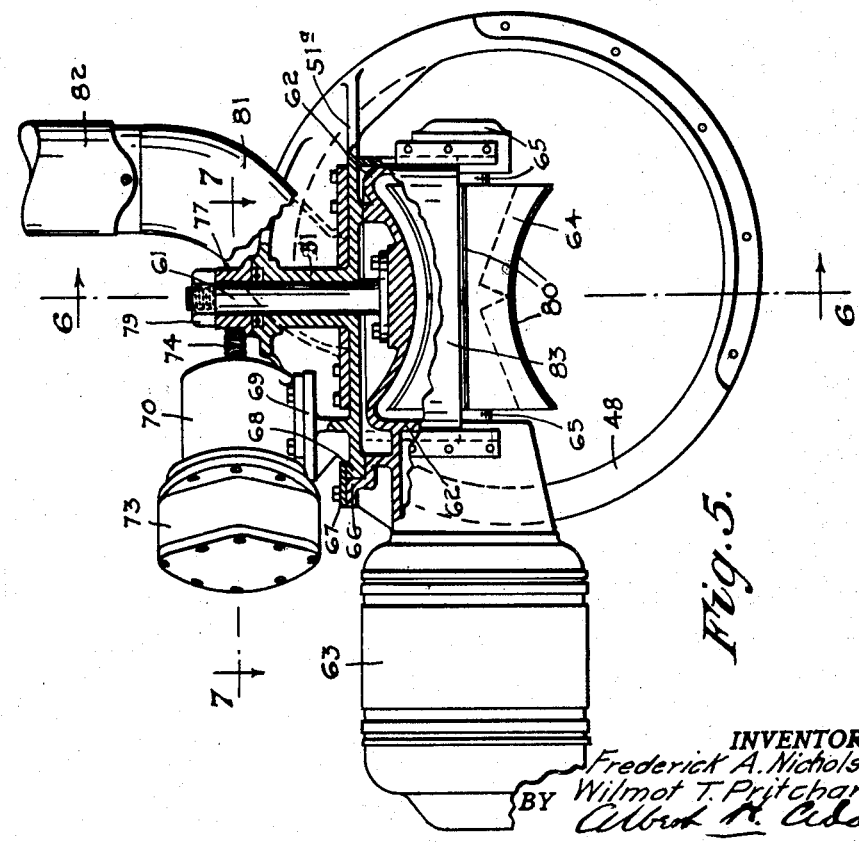
INVENTORS:
Frederick A. Nicholson
Wilmot T. Pritchard
BY Albert H. Adams
ATTORNEY June 25, 1935.  F. A. NICHOLSON ET AL  2,005,799
APPARATUS FOR REMOVING BARK FROM LOGS
Filed Aug. 7, 1933  6 Sheets-Sheet 5
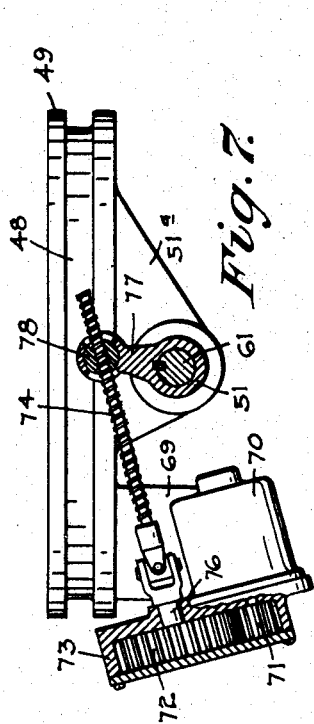
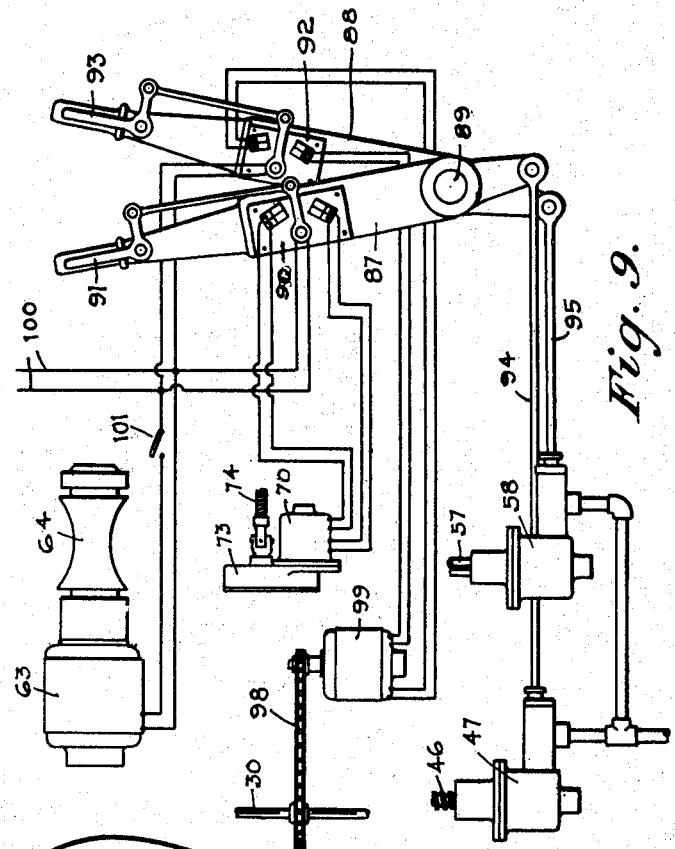
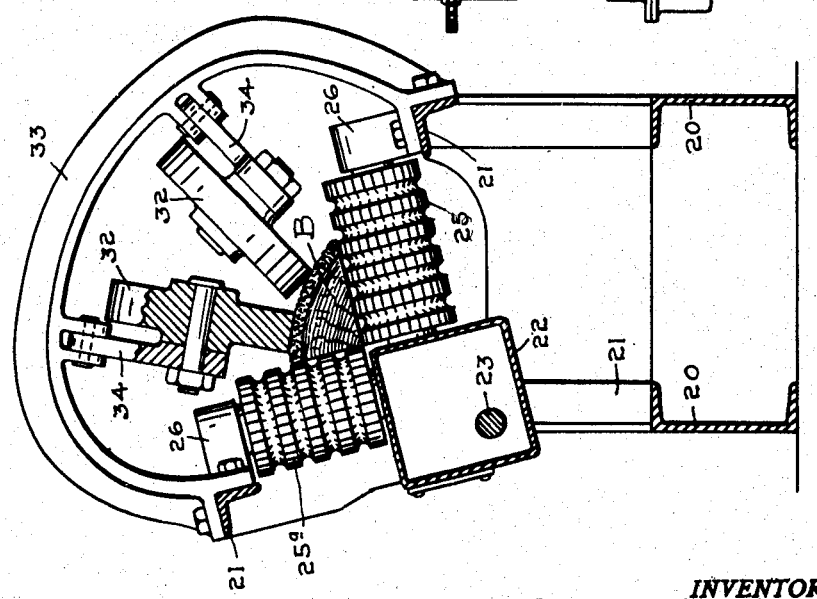
INVENTORS:
Frederick A. Nicholson
Wilmot T. Pritchard
BY Albert H. Adams
ATTORNEY.

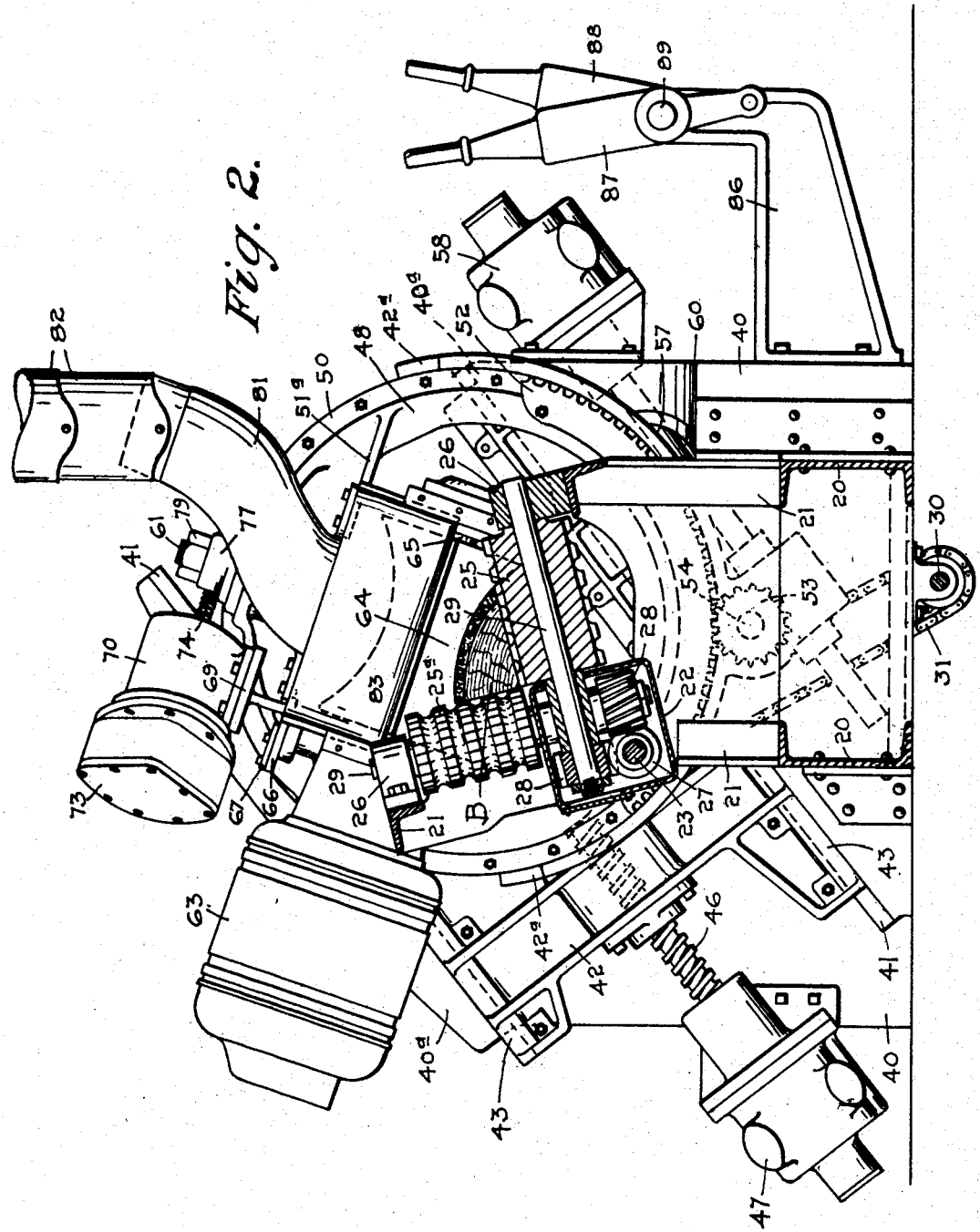

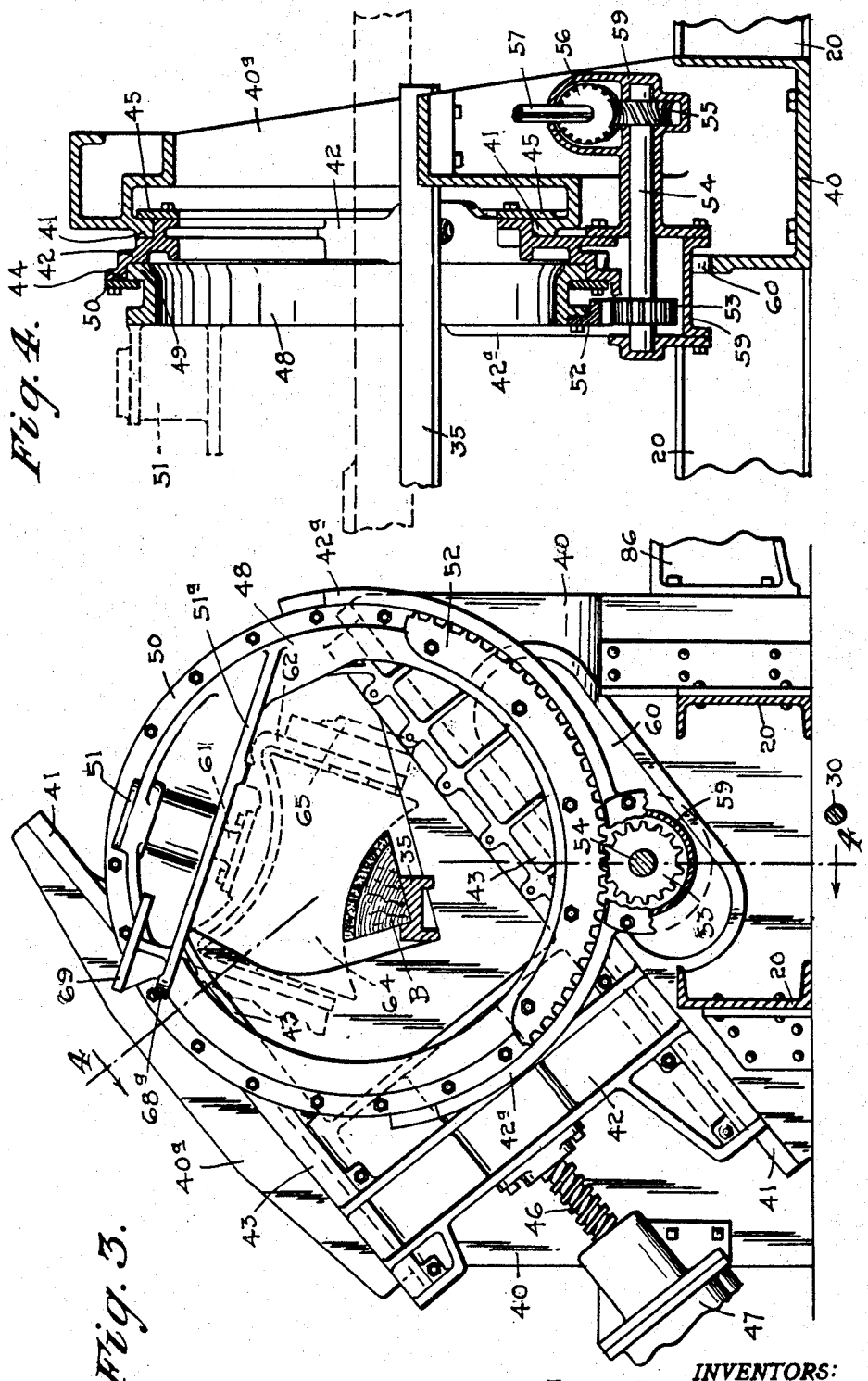

June 25, 1935.   F. A. NICHOLSON ET AL   2,005,799
APPARATUS FOR REMOVING BARK FROM LOGS
Filed Aug. 7, 1933   6 Sheets-Sheet 6
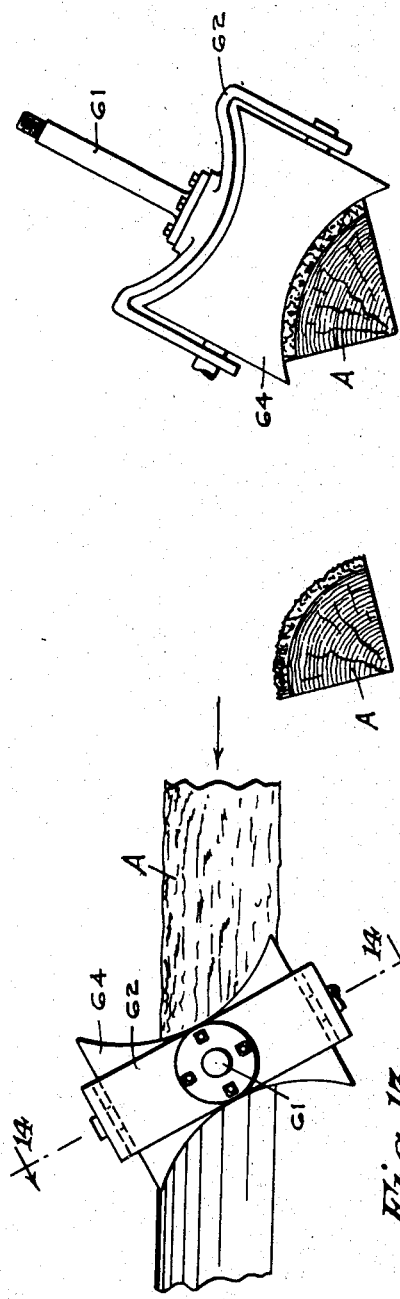
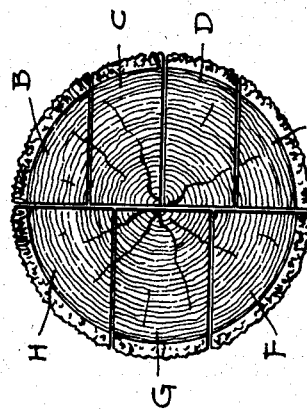
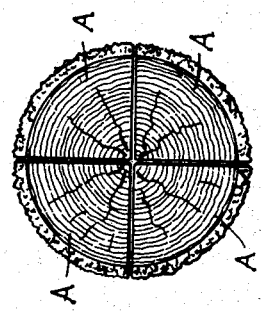
INVENTORS:
Frederick A. Nicholson
BY Wilmot T. Pritchard
Albert H. Adams
ATTORNEY Patented June 25, 1935

2,005,799

UNITED STATES PATENT OFFICE 2,005,799

APPARATUS FOR REMOVING BARK FROM LOGS

Frederick A. Nicholson and Wilmot T. Pritchard, Seattle, Wash., assignors to Stetson-Ross Machine Company, a corporation of Washington Application August 7, 1933, Serial No. 684,036

9 Claims. (Cl. 144—208)

In connection with the making of wood pulp intended for manufacture into paper for newspaper or other uses it is essential that all bark on the logs from which the material is obtained be completely removed. Prior to such removal, however, it is customary to divide the logs longitudinally into a plurality of sections in order to discover and wholly remove all rotten portions that are so frequently found at or adjacent to the central part of a log, for such rotten wood, like bark, if carried into the digester with the sound pieces of wood will result in an inferior pulp product.

This invention relates to improvements in apparatus for "barking", as the act of removing the bark from logs is termed, and one of the leading objects of the invention is, broadly stated, the provision of novel means for supporting and adjusting to various operative positions a rotative cutter-head so as to adapt its curved surface and the correspondingly curved cutting edges of the knives carried thereby to conform as closely as possible to the log's surface from which the bark is to be removed, thereby, through the great flexibility of movement of such cutter-head, permitting it to be instantly changed in position to adapt it to operatively engage log sections of different sizes and that consequently have quite widely varying bark surfaces, and also permitting it to be so changed as to equally well adapt its knives to be properly positioned to engage the bark surface of a log section even when such log section, by reason of its shape, has to be so arranged on the carrying and forwarding means that its curved bark surface cannot be presented, even approximately, in an exposed uppermost position but will have to lie so that such surface, during the entire barking operation, will constitute to a very large extent a side portion of the log section. This flexibility of adjustment of the cutter-head to widely varying operative positions also results in the prevention of cutting away to any material extent the solid wood or body portion that is required for the making of the pulp.

Another important object of the invention is to so construct and arrange the devices that hold and move forward the log section into position to be acted upon by the cutter-head that they will at all times cause the bark surface of such log section to so lie that it will, to quite a large extent, constitute a lateral surface of the said section, thus keeping such log section in a position that will enable the operator of the machine to more easily observe the operation of the cutter-head and consequently be the better able, through the controlling means attached to the machine, to instantly shift the position of the cutter-head from time to time as is frequently necessary to adapt it to varying conditions.

These and other objects that will be set forth later herein are attained by the construction and arrangement of parts as shown in the drawings and hereinafter particularly described. That which is believed to be new will be set forth in the claims.

In the drawings:

Fig. 2 is a vertical cross-section taken on line 2—2 of Fig. 1, the pressure roll at the right hand side of Fig. 1 being omitted.

Fig. 3 is a vertical cross-section taken substantially on line 3—3 of Fig. 1, and showing the relative arrangement of the stationary frame members, the sliding frame movable thereon and the rotatable annular frame member that is supported by said sliding frame, and by the movements of which sliding and rotatable parts certain of the necessary adjustments of the cutter-head are effected.

Fig. 4 is a section taken substantialy on the line 4—4 of Fig. 3, certain elements being omitted to better show the relative arrangement of the sliding frame and the rotatable annular frame, a log section partly denuded of its bark being shown in dotted lines.

Fig. 5 is a detail showing partly in elevation and partly in vertical section the rotary cutter-head, its driving motor and a portion of the mechanism by which it is adjustably supported.

Fig. 6 is a vertical section taken on the line 6—6 of Fig. 5.

Fig. 7 is a view partly in plan and partly in section showing the rotatable annular member from which the cutter-head is supported and the means through which the pivotal turning of the cutter-head is accomplished.

Fig. 8 is a detail, partly in vertical section, illustrating the relative arrangement of one of the pairs of toothed rollers that coact to move a log section longitudinally through the machine. Two pressure rolls that act to keep the log section forced against the toothed rollers are also shown.

Fig. 9 is a diagrammatic view of the electric and compressed air means by which the various movements of the parts of the apparatus are controlled.

Fig. 10 is a cross-section of a log that has been cut into quarter sections.

Fig. 11 is a cross-section of a log of greater diameter than that shown in Fig. 10 and showing such larger log sawed into sections of different shapes.

Fig. 12 is a detached end view of one of the quarter sections of the log of Fig. 10, and canted laterally as it would be while moving through the machine.

Figs. 13 and 14 are diagrammatic views illustrating different positions to which the cutter-head can be adjusted by the operator to bring the knives thereof into positions to effectively engage the bark surface of a log section.

Figure 1:
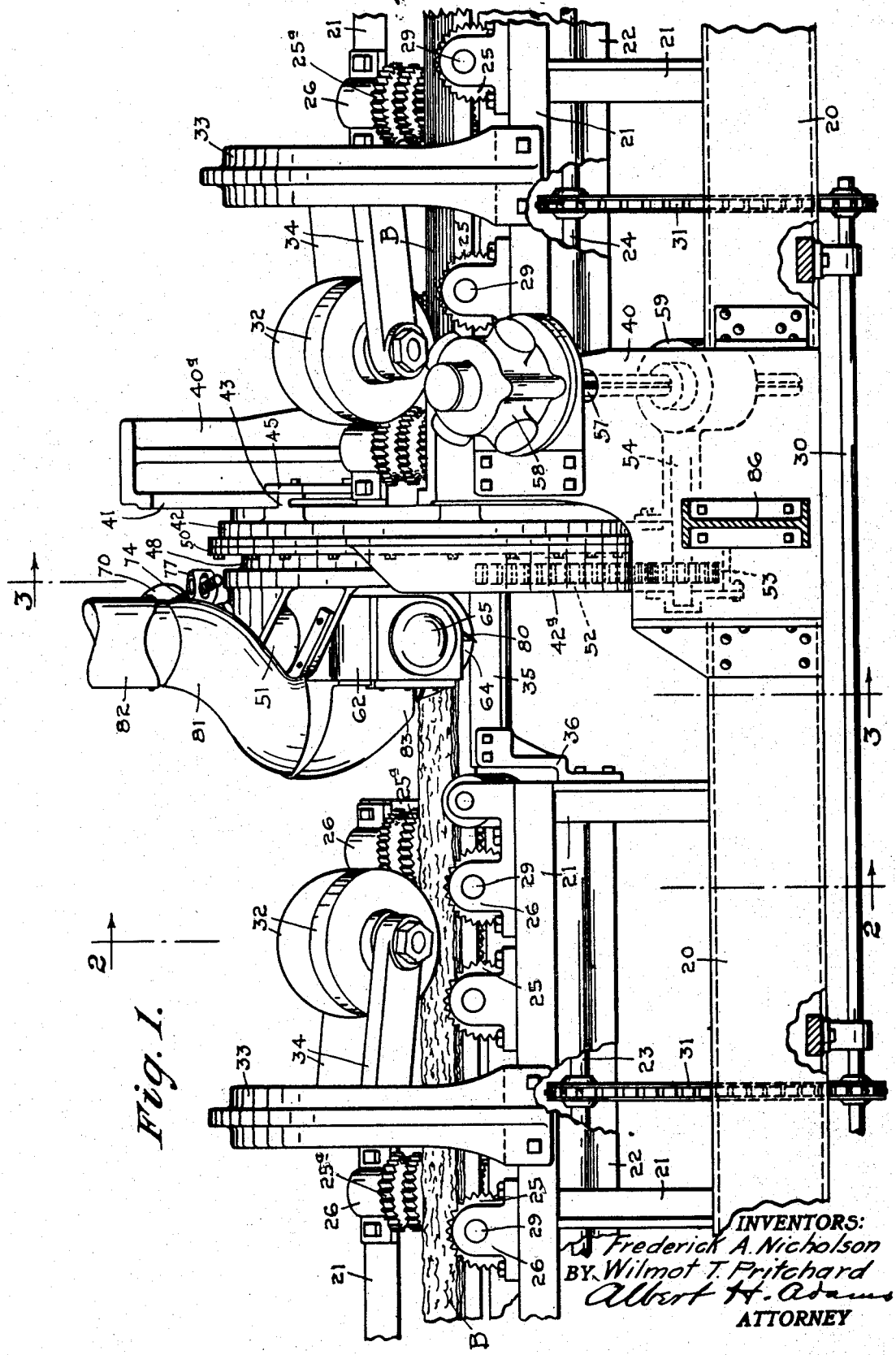
Fig. 1 is a side elevation of the machine with a log section in place and showing that portion of such section at the right hand side of the figure denuded of its bark by the cutter-head under which it had passed.

Referring to the several figures of the drawings in which corresponding parts are indicated by the same reference characters,—20 indicates longitudinally-extending base members that have mounted upon them a heavy frame designated generally by the reference numeral 21. This frame 21 is made in two separated units as clearly shown in Fig. 1, said units being in line with each other, of course, and held in alignment by their connection with the longitudinal base member. 20, 20. Further connection of these frame units to each other is by means of a trough-like member 35 that bridges the gap between the units and also serves as a guiding support for log sections that are longitudinally moved through the machine as hereinafter described. One end of this bridging member 35, in the construction shown, is supported by a bracket 36 to which it is bolted and the other end is bolted to a heavy supporting member 40 that is hereinafter referred to. This bridging piece 35 is of the same angularity as the pairs of rollers 25, 25ᵃ. The two-unit construction of the frame provides between the units the necessary space to allow of movement of certain parts as hereinafter will appear.

Extending along one side of each of the frame units 21 and bolted or otherwise secured thereto is a housing 22, in each of which is journaled a shaft, the shaft in the housing on the log-receiving end (the one at the left hand in Fig. 1) of the machine being indicated by 23 and the other shaft on the log-delivery end being indicated by 24. In connection with each frame unit 21 there are provided a plurality of pairs of toothed rollers 25, 25ᵃ whose function is twofold, viz. to furnish a support for the log sections to rest upon as they pass through the machine and also by their continued rotation to cause the desired movement of the said sections.

As best shown in Figs. 2 and 8 the rollers of each pair are at an angle to each other of approximately 90 degrees. The rollers of each pair are not inclined to the same extent, but are preferably so arranged that one of them is inclined to about 20 degrees from the horizontal while the other is inclined in the opposite direction to stand at about twenty degrees from the vertical. So arranged it will be evident that a log section, whether of the shape of that section that is shown on the rollers in Figs. 2 and 8 or of the character of any of the sections shown in Figs. 10 and 11, and indicated by reference letters A, B, C, D, E, F and G, respectively, will so rest on the rollers that the bark surface will be presented largely toward one side of the machine. This lateral presentation of such surface, thus designedly obtained, is of very considerable importance as it thus presents to the attendant a much better and more complete view of the bark surface than could be attained if the pair of rollers were inclined in opposite directions at the same angle. This will be apparent from Fig. 2 where it will be seen that controls at which the operator is stationed are at that side of the machine towards which the rollers 25 project. These various pairs of rollers are all arranged in the same manner and together constitute in effect a trough-like table for feeding the log sections through the machine.

Each roller has a shaft, designated by 29, to which it is made fast. The upper end of each shaft is journaled in a suitable bearing 26 carried by the frame and the lower portion of each shaft projects into the housing 22 (see Fig. 2) and is there supported by a bearing affixed to said housing. On the lower end of each shaft is secured a spiral gear 28, and meshing with the gears 28 of each pair is a spiral gear 27 that is fast on the shaft 23 or 24. The two aligned shafts 23, 24 are to be so connected together as to rotate uniformly. As here illustrated such driving is attained through a countershaft 30 that is arranged adjacent to one of the base frame members 20 and drive chains 31 that engage sprocket wheels on that countershaft and on the aligned shafts 23, 24.

To hold the log sections down firmly so as to ensure of their being properly engaged and moved by the rotating toothed rollers pressure rolls 32 are provided over the path of travel of the log sections, two of such rolls, in the construction shown, being provided in connection with each of the frame units 21. The axle or shaft on which each of such rolls turns is pivotally connected with the free end of a link 34 the other end of which is pivoted to an arched support 33 as clearly shown in Fig. 8.

Extending transversely and located in the gap between the two frame units 21 and adjacent, in the construction illustrated, to the inner end of the log delivery unit is a heavy frame 40 designed to afford support for the cutter-head and the adjustable elements that are connected therewith. The main or body portion of this supporting frame 40 necessarily lies well below the path of travel of the log sections but from such body portion extend at an angle of approximately forty degrees two heavy arms 40ᵃ, these arms extending up at opposite sides of the machine. Upon each of these diagonal arms is formed a longitudinally-extending strip or rib 41, said strips or ribs acting as guides for a movable frame that is located between said arms 40ᵃ.

The movable frame just referred to and that is adapted to have sliding engagement with the said inclined arms comprises a cross-head 42, and two arms 43 that have sliding engagement with the diagonal frame arms 41 and are held in such sliding engagement by suitable retaining strips 45. Formed with or fixedly secured to the slide arms 43 is an annulus 44 that is provided for the purpose of affording a bearing for the rotatable ring-like support that carries the adjustable cutter-head. The sliding movements of this frame that comprises the parts 42, 43 and 44 are accomplished through the rotation of a threaded shaft 46 that suitably engages the cross-head member 42, said shaft having power applied to it through an ordinary reversible air motor 47, as hereinafter referred to.

Fitting snugly but rotatably within the annulus 44 of the sliding frame device is a rotatable ring-like member 48 that has attached to it the cutter-head that is employed for the removal of the bark from the log sections. This cutter-head supporting member 48 is held in place by a ring 50 bolted to the annulus 44 of the sliding member and projecting past a flange 49 on the rotatable member 48. The rotation of this ring-like member 48 is needed to be made through only a comparatively small arc and is required for the making of one of the several adjustments of the cutter-head, as will be fully set forth later herein. Such rotative movement is effected through the provision of a segmental toothed rack 52 that is bolted or otherwise secured to the member 48 and with which a pinion 53 is in constant mesh. As shown, from the edge portion of the annulus part 44 of the sliding frame there projects a guard in the shape of a segmental flange 42ª of sufficient length to serve to protect the teeth of the rack 52 in any position to which the member 48 may be turned. The said pinion 53 projects through an opening in this guard strip as clearly shown in Fig. 3.

The pinion 53 is fast on a short shaft 54 near one end thereof and adjacent to the other end of such shaft is secured a spiral gear 55 that is in constant engagement with a spiral gear 56 that is mounted on an inclined shaft 57 and slidably held thereon by its engagement with a spline on the shaft. As best shown in Fig. 4 the gearing 52—53 and 55—56 and the short shaft 54 are inclosed by a housing 59 which is fixedly secured to the sliding frame member 42 and necessarily partakes of the movements of such frame. To permit the housed gearing to so move—for, of course, the spiral gear 56 must move along the splined shaft 57—the heavy stationary member 40 is provided with an elongated and suitably inclined opening 60 of sufficient width to permit of the free sliding therein of that portion of the housing that encloses the spiral gears 55 and 56. The inclined splined shaft is driven by a suitable motor 58 (see Figs. 1 and 2), such motor being, in the construction shown, an air-driven one.

The rotary cutter-head that has been referred to is indicated by 64 and its face and the acting edges of the removable knives carried thereby are concave in shape to approximately conform to the curvature of the log sections that the cutter-head acts upon. The cutter-head is suitably journalled in bearings 65 formed with the depending arms of a hanger 62 and such hanger also acts to support, opposite one end of the cutter-head, an electric motor 63 which by suitable connection of its shaft with the cutter-head rotates the same. Extending upwardly from the longitudinal central portion of the hanger 62 and rigidly bolted thereto is a short shaft 61 journalled in a sleeve bearing 51 that, as here shown, is formed in a heavy bracket 51ª integral with and extending out from one face of the ring-like support 48. At that end of the hanger 62 adjacent to the motor 63 the hanger is so formed as to provide an upturned lip 66, the inner face of which is curved and bears against the edge of a correspondingly-curved short section of a flange or rib 68 that projects slightly from the lower part of the bracket 51ª—such short curved edge part being indicated by 68ª in Fig. 3. A short plate 67, best shown in Fig. 5, bolted to the lip portion 66 and overhanging the said rib or flange aids in preventing sagging of the motor-weighted end of the hanger 62, and sliding contact of said hanger near its other end with the under surface of the bracket 51ª also aids in preventing any such sagging.

Among the adjustments that are required to be given from time to time to the cutter-head is one that will so position it that it will extend diagonally across a section of log that is to be barked. Referring now to such adjusting means,—69 indicates a bracket carried by, and preferably integral with, the ring-like member 48. It projects from the same face as the bracket 51ª, and is adjacent to one end of said last-named bracket, and mounted upon it and suitably secured thereto is a reversible electric motor 70. Upon a projecting end portion of the motor shaft is secured a gear 71 which is in mesh with a materially larger gear 72, both of such gears being enclosed in a housing 73. The short shaft 76 of this gear 72 is connected, in the construction shown, by a universal joint with a threaded shaft 74 that at its other end passes through and has threaded engagement with a freely-turning nut 78 fitted into the outer end of a lever 77 that projects from and is keyed to the upper end of the shaft 61 that carries the cutter-head hanger 62. A nut 79 on the upper end of the shaft 61 retains said shaft and the parts carried thereby in operative position.

As before stated the knives carried by the cutter-head have their projecting cutting edges curved to conform to the curvature of the cutter-head's surface, and, as indicated by dotted lines in Fig. 5, each knife is preferably made in two halves or sections, but, of course, may be made continuous from end to end. The knives are indicated by 80.

Rigidly secured to the lower or flanged portion of the sleeve bearing 51 (see Fig. 5) is the lower metal end portion 81 of an ordinary exhaust pipe, the part 82, shown as connected to the part 81, being preferably of flexible material to permit free movement of the part 81 whenever a rotative adjustment of the ring-like member 48 is made. At 83 is shown a member termed a chip breaker. It is slidably mounted at its ends to the hanger 62 in such position relative to the cutter-head as to leave an opening 85 of any predetermined size, and in such position relative to the lower open end of the exhaust pipe as to communicate at all times therewith and thereby constitute, in effect, a part of such exhaust. The opening 85 is to be parallel with and conform in shape to the curved face of the cutter-head. Thus a clear and full exhaust is maintained at all times.

Turning now to the means by which the various movements of the machine are controlled,— 87 and 88 indicate two levers arranged in close proximity to each other, each being pivotally mounted, in the construction shown, at 89 upon a heavy bracket 86 that is bolted to a frame member of the machine and projects to quite a distance from the machine. Through movements of these two hand levers and two smaller levers pivotally attached to them the motive power required to set in motion any of the motors—electric or air—is wholly regulated, and as the arrangement and character of such motor means may be varied to suit varying conditions it has not been deemed necessary to show any details of such motors, as they are to be of any well known construction, nor has it been considered necessary to encumber the several figures of the drawings with the power-carrying connections that extend to such motors. In Fig. 9, however, has been diagrammatically illustrated such parts. Referring very briefly to the showing there made, 90 indicates a double-throw switch mounted upon the hand lever 87, and mounted upon the other hand lever 88 is a similar switch 92. These switch mechanisms are adapted to be controlled through bell-crank levers 91 and 93 mounted, respectively, on the large hand levers 87, 88. At 98 is indicated a drive chain for driving the countershaft 30, said chain being driven by an electric motor 99. The circuits that lead to the electric motors are shown but not designated by reference numerals as that does not appear necessary, but at 100 is indicated the circuit that leads to the dynamo from which the required power is derived, and at 101 is indicated a switch that controls the current to the motor 63 and which may be operated by any suitable means.

With respect to the control of the two air motors 47 and 58 the diagram shows connecting rods 94 and 95 pivotally attached, respectively, to the large hand levers 87 and 88, and adapted, as will be understood, to open and close the valves that control the admission of compressed air to said last-mentioned motors.

While the operations of the various elements of the machine have been stated in connection with the description of their construction and relative arrangement a brief statement of the operation of the apparatus as a whole and the advantages derived therefrom is deemed advisable.

Upon the inclined rolls 25, 25ᵃ on the receiving unit 21 of the machine will be successively deposited by any suitable means log sections which may be of any of the shapes indicated in Figs. 10 and 11 and indicated by the reference letters A to H inclusive. The log sections will be so deposited into the trough formed by these pairs of rolls that their two straight smooth sides will lie against the rolls, and the inclination of the rolls will cause the bark surface to be presented very much toward one side of the machine, viz. toward that side at which the operator of the machines is stationed at the control levers. Such positioning of the log sections enables him to obtain a much better view of the surface that the cutter-head must operate on, and also, of the result attained by the cutting action, than if the rolls were so arranged as to present the bark surface more largely uppermost as in that case quite a bit of the bark surface would extend down on that side of the log that was farthest from him. Through the operation of the motor 99 that drives the countershaft 30 from which power is taken to drive the inclined rolls the operator can regulate the rapidity of movement of the log sections and can, when in his judgment it is necessary or desirable, cause the rolls to be given a reverse movement so as to retract a log section in order to be subjected to a further operation by the cutter-head.

As the log sections vary in size and shape it is essential that the cutter-head be readily adjustable to accommodate it to the varying conditions. In the first place it must be quickly movable toward and from the line of travel of the log sections, and this is accomplished by so actuating the air motor 47 as to cause a sliding movement of the cross-head member 42 and its attached parts and thus position the cutter-head farther from or in contact with the log section to be operated upon. Again, if the log section be from a log of rather small diameter so that the curvature of the bark surface thereon will not conform, even approximately, to the curvature of the cutter-head and its knife edges then it would not be feasible to bring the cutter-head down in a position at right angles to the log, because contact of the knives with the log would result in the removal of a comparatively narrow strip of bark or the cutting away and loss of quite an amount of the solid wood. To avoid this disastrous result the attendant, by causing the motor 70 to function, can so turn the lever 77 as to cause a lateral turning of the cutter-head, through the movable elements connected therewith and hereinbefore described, that will cause it to be presented to the log section diagonally to the line of travel of such section—as for example as shown in Fig. 13—so that its concave face and the correspondingly shaped cutting edges of the knives will conform very closely to the curvature of the bark surface and therefore be enabled to remove the bark with but little, if any, cutting away of the solid wood.

Another and very important adjustment of the cutter-head is that which is accomplished by the rotative movement of the ring-like member 48 through the action of the air motor 58 and the gear mechanism connected therewith as hereinbefore described. The adjustment through these means so moves the cutter-head, which is connected with the member 48 as described, that it will move in a plane at right angles to the line of travel of the log sections and hence can be brought into operative engagement with that portion of the bark surface that is at and adjacent to the lowermost edge of the log section. By this, however, it is not to be understood that this last-mentioned adjustment of the cutter-head must so position it that it will operatively engage only the lateral portion of the log section. On the contrary, owing to the fact that the three adjustments are made independently of each other the cutter-head can be given this last described adjustment and can also be given the adjustment that carries it to a position diagonally across the log section so as to make its curved surface conform to the whole of the bark surface as described above.

The relative arrangement of the driven toothed rolls so that the log sections are kept canted laterally to present their bark surfaces to the view of the attendant and the independent adjustments of the cutter-head to adapt its operation to the constantly varying conditions in work of this description are features that combine to produce cheap, rapid and thorough barking of log sections.

What we claim as new and desire to secure by Letters Patent is as follows:

1. In a machine of the class described, the combination with means for supporting and longitudinally moving a log section, of a cutter-head located above the path of travel of said log section, a rotatable annular member with which said cutter-head is connected, a diagonally-movable support on which said annular member is rotatably mounted, means for adjusting said support to carry said cutter-head toward or away from the log section to be operated upon, and means for rotating said annular member to cause said cutter-head to be bodily moved in a plane at right angles to the said path of travel of the log section.

2. In a machine of the class described, the combination with means for supporting and longitudinally moving a log section, of a cutter-head having a concave surface, a rotatable annular member with which said cutter-head is connected, a diagonally-movable support on which said cutter-head is rotatably mounted, means for adjusting said support to move said cutter-head toward or away from the log section to be operated upon, means for rotating said annular member to cause said cutter-head to be bodily moved in a plane at right angles to the path of travel of the log section to bring said cutter-head into operative engagement with a side portion of said section, and other means for adjusting the cutter-head to conform approximately to the curved surface of said log section.

3. In a machine of the class described, the combination with means for supporting and longitudinally moving a log section, of a cutter-head having a concave surface, a rotatable annular member with which said cutter-head is connected, a diagonally-movable support on which said cutter-head is rotatably mounted, means for adjusting said support to move said cutter-head toward or away from the log section to be operated upon, means for rotating said annular member to cause said cutter-head to be bodily moved in a plane at right angles to the path of travel of the log section to bring said cutter-head into operative engagement with a side portion of said section, and other means for adjusting the cutter-head to conform approximately to the curved surface of said log section, said last-named means comprising a motor supported from and movable with said annular member.

4. In a machine of the class described, the combination with means for supporting a log section while the same is being moved longitudinally, of a cutter-head located above the path of travel of said log section, a rotatable member, means carried by said member for supporting said cutter-head, said supporting means comprising a bracket in which said cutter-head is rotatably supported and a shaft affixed to said bracket and journaled in said rotatable member, means for moving said rotatable supporting member in a direction to carry the cutter-head toward or away from the said path of travel, means for rotating said supporting member, and other means for rocking said bracket shaft to cause a turning of the cutter-head to a position diagonal to said path of travel of the log section.

5. In a machine of the class described, the combination with means for supporting a log section while the same is being moved longitudinally, of a cutter-head located opposite the path of travel of said log section, a rotatable member, means carried by said member for supporting said cutter-head, said supporting means comprising a bracket in which said cutter-head is rotatably supported and a shaft affixed to said bracket and journaled in said rotatable member, means for moving said rotatable supporting member in a direction to carry the cutter-head toward or away from said path of travel, means for rotating said supporting member, and other means for rocking said bracket shaft to cause a turning of the cutter-head to a position diagonal to said path of travel of the log section, said last-named means comprising a motor supported from and movable with said annular member and including also mechanism interposed between and connecting the shaft of said motor with said bracket shaft.

6. In a machine of the class described, the combination of two aligned separated units, a plurality of inclined toothed rollers supported by each of such units, said rollers of each unit forming a trough-like support and moving means for a section that has been severed lengthwise from a log, the rollers that constitute one side of such trough projecting at a different inclination from those at the other side whereby a log section resting on and moved by said rollers will be tilted laterally to present more of its bark surface toward one side of the machine, means for driving all of said toothed rollers synchronously, a stationary element located in the space between said units and projecting to a considerable distance above the said trough-like support, a cutter-head, and means carried by said stationary element for supporting said cutter-head.

7. In a machine of the class described, the combination of a supporting frame, a plurality of inclined toothed rollers mounted upon said frame, said rollers being arranged to form a trough-like support for a section that has been severed lengthwise from a log, the rollers that constitute one side of such trough projecting at a different inclination from those that constitute the other side, whereby a log section resting on said rollers will be tilted laterally to present more of its mark surface toward one side of the machine, means for driving all of said toothed rollers synchronously, a stationary element located opposite an end portion of said supporting frame and projecting to a considerable distance away from such trough-like support, a cutter-head, and means carried by said stationary element for movably supporting said cutter-head, said stationary element being located and arranged to permit the passage past it of the log section after such section has been acted upon by the cutter-head.

8. In a machine of the class described, the combination of means for sustaining in a laterally-tilted position a section that has been severed lengthwise from a log, a cutter-head, three separate means for effecting adjustments of the cutter-head with respect to the log section, one of such adjustments being toward and from the section, a second adjustment being in a plane at right angles to the path of travel of the section, and the third adjustment being to a position diagonal to said line of travel, and independently-controlled means for operating each of such adjusting means separately or operating either of the two last-named adjusting means simultaneously with the first-named means.

9. In a machine of the class described, the combination with means for supporting and longitudinally moving a log section, of a cutter-head located opposite a bark-covered surface of said log section, three separate means for effecting adjustments of the cutter-head with respect to the log section, one of such adjustments being toward and away from the section, a second adjustment being to position it in a plane at right angles to the path of travel of the section, and the third adjustment being to a position diagonal to said line of travel, and independently-controlled means for operating each of said adjusting means separately or operating either of the two last-named adjusting means simultaneously with the first-named means.

FREDERICK A. NICHOLSON.
WILMOT T. PRITCHARD.